Jan. 2, 1962   H. P. TAYLOR   3,015,767
TACHOMETER STABILIZATION NETWORKS
Filed Nov. 12, 1957

INVENTOR
HUGH P. TAYLOR
By Elmer J. Gorn
ATTORNEY 3,015,767
Patented Jan. 2, 1962

3,015,767
TACHOMETER STABILIZATION NETWORKS
Hugh P. Taylor, Littleton, Mass., assignor to Raytheon
Company, a corporation of Delaware
Filed Nov. 12, 1957, Ser. No. 695,927
3 Claims. (Cl. 318—28)

This invention relates generally to feedback systems and particularly to compensation networks for stabilizing said systems.

In tachometer-stabilized servo-systems the voltage output of the tachometer used in the feedback path usually contains very undesirable components at or near null when the tachometer has essentially a zero or very small voltage input. The null-output of the tachometer usually contains a small in-phase component and, at times, a relatively large quadrature component. The in-phase component tends to give rise to an error voltage when the servo system has a zero input, and the quadrature component tends to saturate the amplifiers of the system and, thus, to reduce the system sensitivity.

The invention herein disclosed overcomes these disadvantages by providing a compensation network that reduces both the in-phase and quadrature components at null by reducing the gain in the feedback path when the tachometer input has a value below a predetermined amount. When an error does exist, however, and the tachometer input has a value above this predetermined amount, the compensation network provides for full gain in the feedback path.

The operation of this invention can be best understood with the help of the drawing in which.

Figure 1:
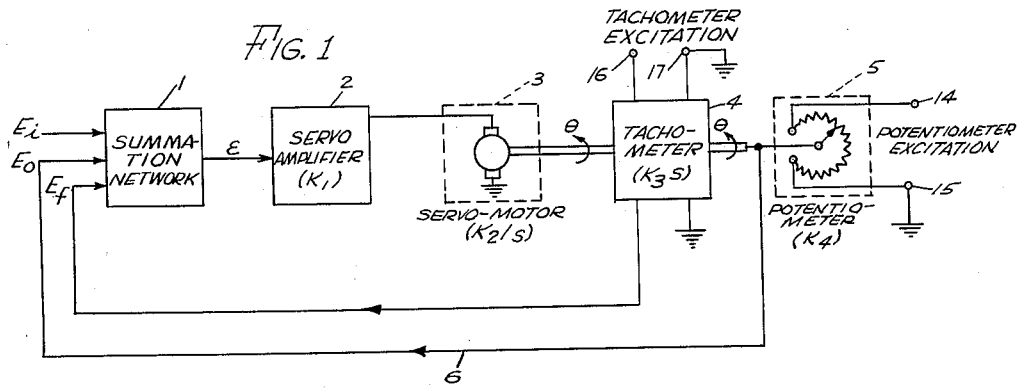
FIG. 1 shows a diagram of a typical tachometer-stabilized servo-system.

In FIG. 1, a conventional summation network 1 receives an input voltage $E_i$, an inner-loop rate-feedback voltage $E_f$, and an outer-loop position-feedback voltage $E_o$ at its input terminals and provides an output error voltage $\epsilon$ representing the sum of the input voltages. This voltage is fed to a servo amplifier 2 which has a gain $K_1$. The servo amplifier drives a servo motor 3 having a transfer function $K_2/s$ where $K_2$ represents the D.-C. gain and $1/s$ is the Laplace operator representing the variable frequency gain. Thus, the motor furnishes a shaft rotation, the angular position $\theta$ of which is proportional to the integral of the input voltage to the motor. A voltage $E_o$ proportional to the angular position $\theta$ is obtained by means of a potentiometer 5 placed so that its variable arm is driven by the motor shaft. The potentiometer excitation is provided at the terminals 14 and 15. The position feedback path 6 is a direct path from the variable arm at the output of potentiometer 5 to an input of the summation network 1.

The rate feedback path contains the tachometer 4 mounted on the motor shaft. The tachometer may be a conventional type that supplies a rate-feedback voltage $E_f$ which is proportional to the angular rate of rotation of the motor shaft to another input of the summation network 1. The tachometer has a transfer function $K_3s$, where $K_3$ represents the D.-C. gain and $s$ is the Laplace operator representing the variable frequency gain of the tachometer. The excitation of the tachometer is provided at the terminals 16 and 17.

In this system a zero input voltage $E_i$ theoretically should produce zero voltage to the servo motor and, hence, no rotation of the motor shaft. With no shaft rotation the tachometer should provide zero output. However, a null voltage having in-phase and quadrature components does exist at the tachometer output as explained above. The in-phase component causes an error signal that ultimately causes the motor to rotate even though the input command $E_i$ is zero. The quadrature component tends to saturate the system amplifiers and thereby reduces the system sensitivity at or around the null point.

Figure 2:
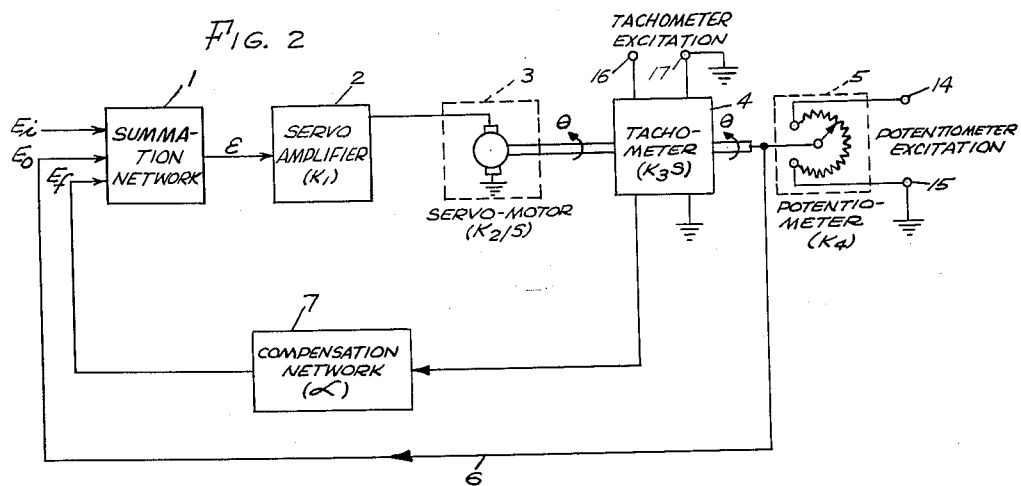
FIG. 2 shows a diagram of the servo-system of FIG. 1 with the compensation network added.
Figure 3:
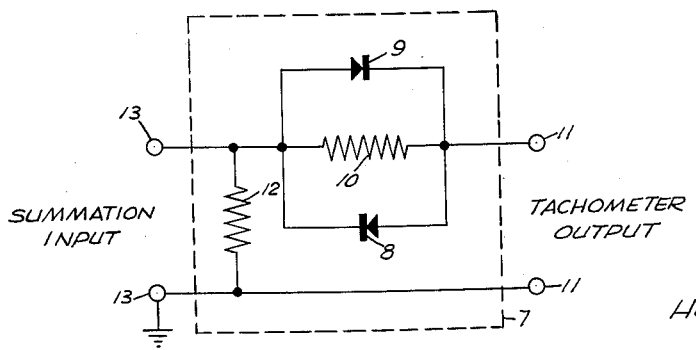
FIG. 3 shows a schematic diagram of one embodiment of the compensation network of the invention.

In FIG. 2, a compensation network 7 has been added in series with the tachometer in the rate-feedback path to reduce the effect of the in-phase and quadrature at or around the null point. The schematic of the compensation network is shown in FIG. 3. The network is composed of a parallel combination of crystal diodes 8 and 9 and resistor 10. The anode of diode 8, the cathode of diode 9 and one end of resistor 10 are connected together and this junction point is connected to the high side of tachometer output terminals 11. The cathode of diode 8, the anode of diode 9 and the other end of resistor 10 are connected together and this junction point is connected to one end of resistor 12 and to the high side of input terminals 13 of the summation network 1. The other end of resistor 12 is connected to ground.

For zero or very small tachometer voltages at or around the null point, the diodes are non-conducting and have very high impedances essentially equivalent to open circuits. The impedance of the compensation network is then determined by the resistors 10 and 12 which provide an attenuation network that reduces the tachometer voltage to a value that is below the threshold sensitivity of the motor amplifier in the forward path. When an error signal develops because of an increase in command input voltage $E_i$, a larger voltage is obtained at the output of the tachometer and one of the diodes conducts, depending on the sign of the output voltage. The conducting diode then provides essentially a short circuit that bypasses resistor 10. No attenuation occurs and the full tachometer feedback voltage required for system stability is furnished to the summation network.

The normalized transfer function of the compensation network can be symbolically represented by $\alpha$. The transfer function $\alpha$ is equal to unity when the tachometer is not at or near a null position and the error signal exceeds the threshold sensitivity. The transfer function is equal to $R_{12}/R_{12}+R_{10}$ when the tachometer is at or near a null position.

The effect of such a compensation network on the overall transfer function of the systems can be seen from the following analysis. If the value of the product $(K_1K_2)$ is much greater than the value of $K_3$, the transfer function $E_o/E_i$ of the uncompensated system shown in FIG. 1 can be written as:

$$\frac{E_0}{E_i} = \frac{1}{\tau_1 s + 1}$$

where the time constant $\tau_1$ of the system is essentially equal to $K_3/K_4$.

If the product $(K_1K_2)$ is much greater than the product $(K_3\alpha)$, the transfer function of the compensated system shown in FIG. 3 can be written as:

$$\frac{E_0}{E_i} = \frac{1}{\tau_2 s + 1}$$

where $\tau_2$ equals $K_3\alpha/K_4$.

If an input signal $E_i$ has a value such as to cause a tachometer output sufficient to bring about conduction of the diodes 8 or 9, the value of $\alpha$ is equal to unity and the time constants for the compensated and uncompensated systems are equal. If the input signal $E_i$ is zero or very small, the time constant of the compensated system is smaller than that of the uncompensated system by the factor $\alpha$, the value of which is less than unity and depends on the values of resistors $R_{12}$ and $R_{10}$. Thus, while the quadrature and in-phase components at or around the null point are considerably reduced, the only effect on the overall system is to reduce the system time constant only at or in the vicinity of the null point so that overall system operation is not appreciably effected.

Others skilled in the art can find other uses for such a compensation network either in other feedback servo systems or in any system where a change in voltage input requires a change in gain of a particular path. Other elements than crystal diodes can be used in the network. Accordingly, it is desired that the invention not be limited by the details of the particular embodiment described herein except as amended by the appended claims.

What is claimed is:

1. In combination, a network adapted to be connected to a source of input voltage including a first resistor connected at one end to said source and a second resistor connected from the other end of said first resistor to a reference point for multiplying said input voltage by less than unity when said input voltage is less than a predetermined value, and a pair of diodes connected in parallel with said first resistor for multiplying said input voltage substantially by unity when said input voltage is greater than said predetermined value.

2. A servo system including, in combination, comparison means connected to a source of input voltage, forward-path means connected to said comparison means for producing an output signal, feedback means connected to said forward-path means for producing a feedback signal the value of which is proportional to the rate of change of said output signal, and compensating means connected to said feedback means and to said comparison means including impedance means for multiplying said feedback signal by less than unity when said feedback signal is less than a predetermined value and rectifying means for multiplying said feedback signal by substantially unity when said feedback voltage is greater than said predetermined value.

3. A servo system including, in combination, a summation network connected to a source of input voltage for producing an error signal, an amplifier connected to said summation network, a servo-motor connected to said amplifier for producing a rotation of a shaft the angular position of which is proportional to the integral of said error signal, a tachometer connected to said shaft for producing a rate-feedback signal the value of which is proportional to the rate of angular rotation of said shaft, a compensation network connected to said tachometer and to said summation network including a combination of rectifiers and resistive impedances for supplying a compensated feedback signal the value of which is less than said rate feedback signal when said rate signal is less than a predetermined amount and the value of which is substantially equal to said rate signal when said rate signal is greater than said predetermined amount.

References Cited in the file of this patent

UNITED STATES PATENTS

| | | |
|---|---|---|
| 2,511,468 | Harrison | June 13, 1950 |
| 2,546,758 | Lawry | Mar. 27, 1951 |
| 2,666,169 | Jarvis | Jan. 12, 1954 |
| 2,769,137 | Creusere | Oct. 30, 1956 |
| 2,783,421 | Hering | Feb. 26, 1957 |
| 2,784,369 | Fenemore et al. | Mar. 5, 1957 |
| 2,835,867 | Golden | May 20, 1958 |
| 2,852,680 | Radcliffe | Sept. 16, 1958 |
| 2,913,654 | Clark | Nov. 17, 1959 |

FOREIGN PATENTS

| | | |
|---|---|---|
| 733,781 | Germany | Apr. 2, 1943 |